United States Patent
Okamura

(10) Patent No.: US 6,271,764 B1
(45) Date of Patent: *Aug. 7, 2001

(54) INCOMING CALL ALERTING METHOD FOR A RADIO COMMUNICATION APPARATUS CONNECTED TO AN EXTERNAL APPARATUS

(75) Inventor: Akira Okamura, Tama (JP)

(73) Assignee: Kabushiki Kaisha Toshiba, Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,494

(22) PCT Filed: Dec. 17, 1997

(86) PCT No.: PCT/JP97/04651

§ 371 Date: Aug. 17, 1998

§ 102(e) Date: Aug. 17, 1998

(87) PCT Pub. No.: WO98/27709

PCT Pub. Date: Jun. 25, 1998

(30) Foreign Application Priority Data

Dec. 17, 1996 (JP) .................................................. 8-336946

(51) Int. Cl.$^7$ ........................................................ G08B 5/22
(52) U.S. Cl. .............................. 340/825.44; 340/825.46; 340/636; 340/825.44; 340/407.1; 340/407.2; 455/573
(58) Field of Search ............................ 340/825.44, 825.16, 340/10.33, 10.34, 825.46, 407.1, 407.2, 636; 323/303; 455/343, 573

(56) References Cited

U.S. PATENT DOCUMENTS

| | | | | |
|---|---|---|---|---|
| 5,043,721 | * | 8/1991 | May | 340/825.44 |
| 5,570,004 | * | 10/1996 | Shibata | 323/303 |
| 5,696,497 | * | 12/1997 | Mottier et al. | 340/825.44 |

FOREIGN PATENT DOCUMENTS

| | | | |
|---|---|---|---|
| 0 688 125 | | 12/1995 | (EP) . |
| 6-510646 | | 11/1994 | (JP) . |
| 08032694 | * | 2/1996 | (JP) . |
| 08321859 | * | 12/1996 | (JP) . |
| 93/15590 | | 8/1993 | (WO) . |

* cited by examiner

Primary Examiner—Michael Horabik
Assistant Examiner—M Shimizu
(74) Attorney, Agent, or Firm—Banner & Witcoff, Ltd.

(57) ABSTRACT

A radio communication apparatus which has plural incoming call informing methods including at least an incoming call informing method by vibration, the radio communication apparatus being available to connect to an external device, comprises a setting section for setting at least one incoming call informing method from the plural incoming call informing methods, a detecting section for detecting whether an electrical connection is made with an external device, and an informing section for detecting that the setting section sets the incoming call informing method by vibration as the at least one incoming call informing method on detection of the electrical connection of the electrical connection by the detection section and indicating that the setting section sets the incoming call informing method by vibration.

10 Claims, 3 Drawing Sheets

INCOMING CALL ALERTING METHOD FOR A RADIO COMMUNICATION APPARATUS CONNECTED TO AN EXTERNAL APPARATUS

TECHNICAL FIELD

The present invention relates to a radio communication apparatus such as a portable telephone and a terminal device of a PHS (Personal Handy-phone System), which carry out electric charging by using, e.g., an electric charger, and a method of detecting the electrical connection between the radio communication apparatus and an external device.

BACKGROUND ART

In the PHS terminal units or portable telephone systems (hereinafter to be referred to simply as "terminal units") there are known terminal units designed to notify the slave by vibration, or having a vibrator function. According to the vibrator function, an incoming call can be informed to the user even under the situation where no incoming call sound can be released such as during a conference, where the radio terminal unit is kept in a pocket, or a incoming call sound is less easily heard due to the circumference noise and the like.

However, while the vibrator function is convenient as above, it has the following problems.

For instance, assuming the case of the incoming call of a terminal unit occurring under the state of the vibrator function being set during the charging thereof, the following problems are involved.

(1) Due to the vibration of the terminal unit, uncomfortable vibration noise is issued from the space between the charger and the desk or between the terminal unit and the charger.

(2) Due to the vibration of the terminal unit, the charging terminal of the power supply section wears out.

(3) The terminal unit along with the charger moves and can fall from the desk or the like, resulting in destruction.

(4) In a case that a function capable of responding to the incoming call simply by taking up the terminal unit from the charger, i.e., so-called quick talk function is set, the charging terminals of the charger and the terminal unit show repeated non-contact and contact due to vibration, thus making arbitrary response to the incoming call against the user's will, and further immediately off-hooking following the response.

(5) In a case that the charger is of a type to judge the completion of charging by the timer, notwithstanding the completion of the charging, the actions of non-contact and contact of the charging terminal are repeated, thereby causing the display indicate charging again, leading to a danger of continuation of over-charging.

Furthermore, besides the above charging, at the time of the connection with other apparatuses (e.g., in case of a direct connection of the terminal unit with the computer), vibration of the terminal unit may be liable to give ill effect on the apparatuses to be connected.

As described above, according to the conventional communication terminal devices, when, for example, charging or the like is performed using a power supply unit contact type charger under the state of the incoming call information function by vibration being set, problems are involved such as to generate uncomfortable vibration noise by vibration information of the incoming call or abrasion of the charging terminal at the power supply section, and so on.

SUMMARY OF THE INVENTION

An object of the present invention is to provide a radio communication apparatus designed to inform by vibration the user of the condition of incoming call information being set when electrical connection to the charger or the like is made under the condition of the incoming call information function by vibration being set, and a method for detecting the electrical connection between the radio communication apparatus and the external devices.

A radio communication apparatus according to the first aspect of the present invention which has plural incoming call informing methods including at least an incoming call informing method by vibration, the radio communication apparatus being available to connect to an external device, comprises: a setting section for setting at least one incoming call informing method from the plural incoming call informing methods; a detecting section for detecting whether an electrical connection is made with the external devices or not; and an informing section for detecting that the setting section sets the incoming call informing method by vibration as the at least one incoming call informing method on detection of the electrical connection of the electrical connection by the detection section and informing that the setting section sets the incoming call informing method by vibration.

A method of detecting electrical connection between a radio communication apparatus and an external device according to the first aspect of the present invention, in which the radio communication apparatus has plural incoming call informing methods including at least an incoming call informing method by vibration, comprises: a first step of setting at least one incoming call informing method from the plural incoming call informing methods; a second step of detecting whether an electrical connection is made with the external device or not; and a third step of detecting that the setting section sets the incoming call informing method by vibration as the at least one incoming call informing method on detection of the electrical connection of the electrical connection in the second step and informing that the incoming call informing method by vibration is set in the first step.

A preferred embodiment according to the first aspect of the present invention is as follows:

(1) The external device is a charger for charging a secondary cell.

(2) The electrical connection is informed by audible sound.

(3) The electrical connection is informed by visual section.

According to the first aspect of the present invention, it is designed such that, when electrical connection is made with the external device under the condition of the function of informing the incoming call by vibration being set, the condition is detected and report is made to the effect that the vibrator incoming call informing function is set. Accordingly, a warning may be issued to prevent damage of the connecting part with the external device or an abnormal sound by interference with the external device.

When, for example, charging is made or any electrical connection is made under the condition of the function of informing the incoming call by vibration being set, the user may be informed of the fact that it is while the incoming call information by vibration is set. The conventional problem as described above can be solved.

A radio communication apparatus according to the second aspect of the present invention which has plural incoming call informing methods including at least an incoming call informing method by vibration, the radio communication apparatus being available to connect to an external device, comprises: a detecting section for detecting whether an electrical connection is made with the external device or not; and an inhibiting section for inhibiting an incoming call in case of it being impossible to communicate due to electrical connection during the connection with the external device.

A method of detecting electrical connection between a radio communication apparatus and an external device according to the second aspect of the present invention, the radio communication apparatus having plural incoming call informing methods including at least an incoming call informing method by vibration, comprises the steps of: detecting whether an electrical connection is made with the external device or not; and inhibiting an incoming call in case of it being impossible to communicate due to electrical connection during the connection with the external device.

A preferred embodiment according to the second aspect of the present invention is that the external device is a PC card.

According to the second aspect of the present invention, if, in case of the electrical connection with the radio communication apparatus of the present invention, it becomes impossible to make service through the connected external device, an incoming call is to be automatically inhibited. Therefore, it is possible to make electrical connection with the external device without being conscious of the incoming call mode.

DETAILED DESCRIPTION

Hereinafter, an embodiment of the present invention is described with reference to the drawings. In this embodiment, explanation is given taking an example of the PHS terminal unit as a terminal unit.

Figure 1:
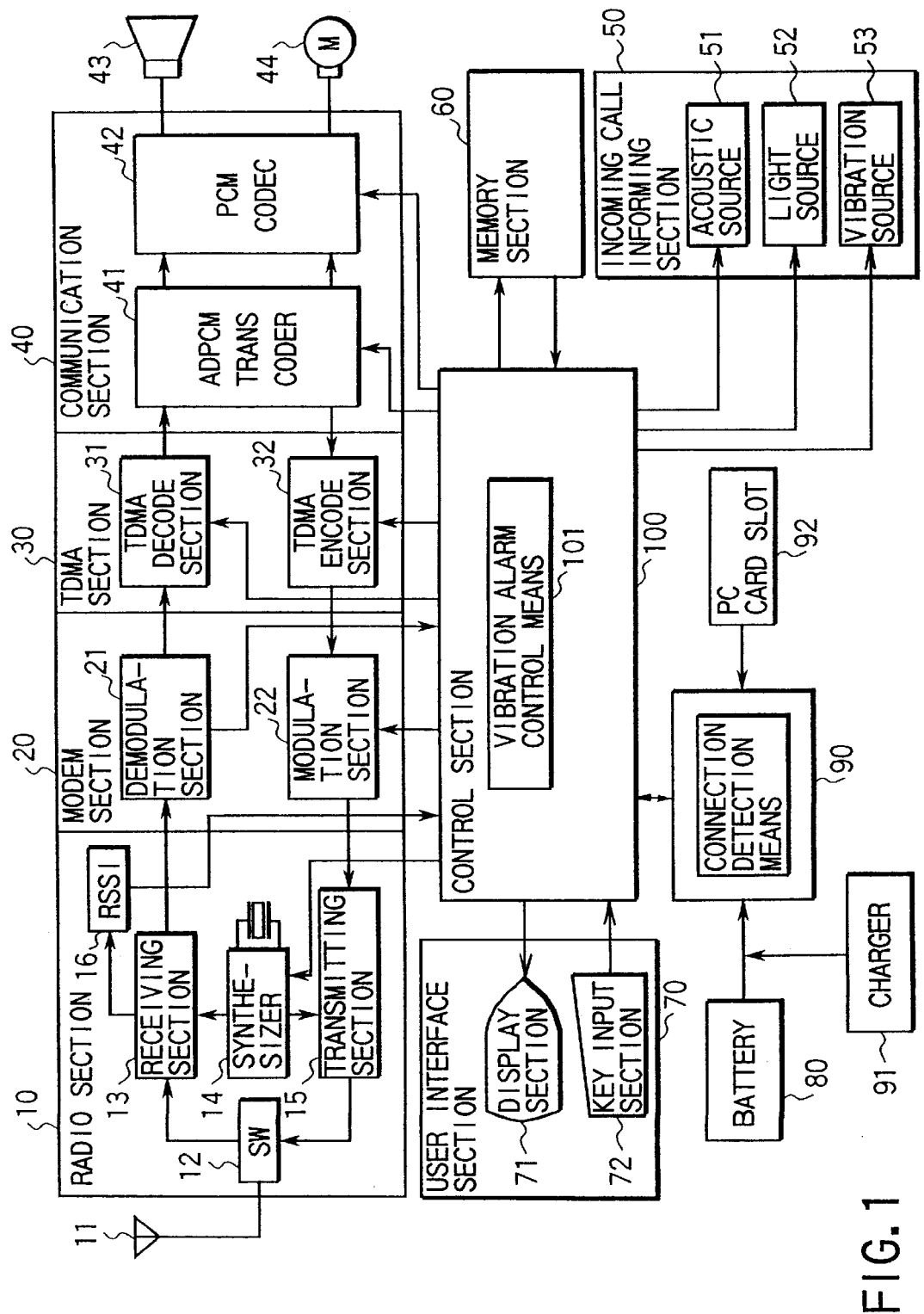
FIG. 1 is a block diagram showing the general constitution of the terminal unit according to the present invention.

FIG. 1 is a block diagram showing a schematic constitution of the terminal unit according to the present invention.

The PHS terminal unit shown in FIG. 1 is constituted by a radio section 10 equipped with an antenna 11, a modem section 20, a TDMA section 30, a communication section 40 equipped with a microphone 44 (M), an incoming call informing section 50, a memory section 60, a user interface section 70, a battery 80, a connection detection means 90, and a control section 100.

The radio frequency signal sent from the PHS base station through the radio communication channel is received by the antenna 11, after which it is inputted to the receiving section 13 through the high frequency switch (SW) 12 of the radio section 10.

In this receiving section 13, the radio frequency signal received above is mixed with the receiving local oscillation signal generated from the frequency synthesizer 14 and frequency-converted to the receiving intermediate frequency signal.

The local oscillation frequency generated from the above frequency synthesizer 14 is controlled from the control section 100 according to the radio channel frequency. The radio section 10 is provided with a receiving electric field intensity detecting section (RSSI) 16. The receiving electric field intensity detecting section 16 detects the received electric field intensity of the radio frequency signal coming from the PHS base station, and notifies the control section 100 of the detected value.

The received intermediate frequency signal outputted from the receiving section 13 is inputted to the demodulation section 21 of the modem section 20. The demodulation section 21 demodulates the received intermediate frequency signal, thereby a digital communication signal is reproduced.

In the TDMA decode section 31 of TDMA section 30, the digital communication signal is decomposed on each time slot in accordance with an instruction from the control section 100. Among the decomposed plural digital communication signals, the digital communication signals of the slot addressed to the own device are inputted to the communication section 40.

The communication section 40 comprises an adaptive difference PCM transcoder 41 and a PCM codec 42. The digital communication signals are sequentially decoded by these adaptive difference PCM transcoder 41 and PCM codec 42 and reproduced into the analog communication signals. The analog communication signals are amplified by the received signal amplifier (not shown), and then outputted in loud voice through the speaker 43.

On the other hand, the transmitted voice inputted to the microphone 44 is sequentially coded by the PCM codec 42 and the adaptive difference PCM transcoder 41 to become a digital communication signal and is inputted to the TDMA encode section 32.

In the TDMA encode section 32, the digital communication signal outputted from the adaptive difference PCM transcoder 41 is inserted in a time slot designated by the control section 100 and inputted to the modulation section 22. The modulation section 22 modulates the carrier wave signal into digital type by the above digital communication signal. The modulated carrier wave signal is inputted to the transmitting section 15.

The transmitting section 15 converts the modulated carrier signal into the radio channel frequency designated by the control section 100 by mixing the modulated carrier wave signal with the transmission station oscillation signal generated from the frequency synthesizer 14, and amplifies it to the predetermined transmission power level. The radio frequency signal, which is frequency-converted and signal-amplified by the transmitting section 15, is transmitted to the PHS base station from the antenna 11 through the high frequency switch 12.

The incoming call informing section 50 is to inform a user of the incoming call by the control of the control section 100 in case of the incoming call to the terminal unit. It comprises an acoustic source 51 for giving information by generating an audible sound, a light source 52 for giving information by illumination, and a vibration source 53 for giving information by generating vibration by, for example, an eccentric motor.

The memory section 60 comprises a semiconductor memory such as, for example, ROM or RAM, as memory medium. This memory medium memorizes various control data, various setting data, dial data coordinate with the shortcut dial, etc., besides the ID data of the unit required for the control program of the control section 100 and authentication.

The user interface section 70 comprises a display section 71 and a key input section 72. The display section 71 comprises, for example, an LCD (Liquid Crystal Display) and visually displays the condition of the device (sending call/incoming call, battery remaining amount, receiving intensity) and the dial data read out from the memory section 60.

The key input section 72 comprises the function setting key for carrying out various kinds of setting such as change of incoming call information (audible sound/light/vibrator/no information) in addition to the key for carrying out ordinary functions of sending/incoming call such as ten keys for inputting dial number.

The battery 80 comprises secondary batteries such as a lithium ion battery, nickel hydrogen battery, etc., and it is the drive power source for the terminal device. The connection detection means 90 detects whether or not a charger 91, a PC card slot 92 (to the PC card slot 92, normally personal computer or the like is connected), etc. are connected. Also, the battery monitor section (not shown) functions to monitor the battery 80, detects the remaining amount of the battery capacity and notifies the control section 100 of it.

The control section 100 comprises, for example, a microcomputer as a main control section, and carries out ordinary controls including the controls accompanied with transmission and reception, change of incoming call information method, etc. The control section 100 comprises vibration alarm control means 101 and carries out controls of alarm information when the terminal unit is electrically connected with the external device in case the terminal device is under the incoming call information setting by the vibrator (vibration source 53).

Figure 2:
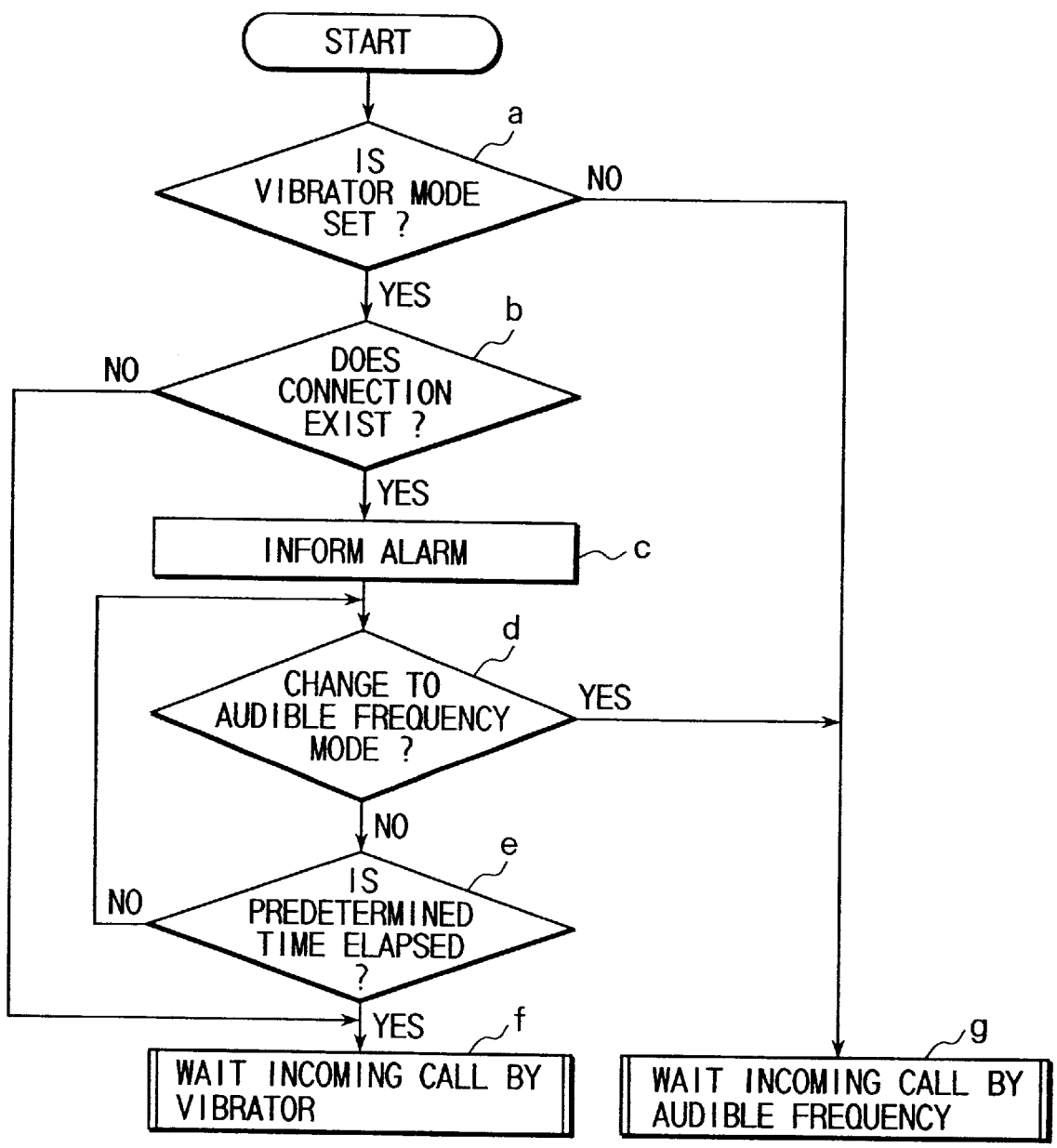
FIG. 2 is a flow chart showing the operation of the terminal unit shown in FIG. 1.

The operation of the PHS terminal device will be explained with reference to FIG. 2. An explanation of ordinary sending and receiving calls is omitted because operations thereof are similar to the conventional ones. Specifically, the case where charging is made under the condition, in which incoming call information by vibration is set, will be described. FIG. 2 is a flow chart for explaining the operation of the terminal device according to the present invention.

At first, the user operates the key input section 72 and sets the incoming call information by vibrator function as a method for informing a user of an incoming call. When this setting is made, an incoming calls is indicated by vibration of the vibration source 53 thenceforth. Thereafter, when the PHS terminal device is electrically connected with the external device (hereinafter, explanation is given on the case of "charger"), the detection means 90 detects the connection and notifies the control section 100 of the detection result.

When the control section 100 receives information of the electrical connection with the charger from the connection detection means 90, the vibration alarm control means 101 determines whether the incoming call informing method is set to be the information by the vibrator 53 or not (Step a). In step a, if the vibrator function is set, an operation of step b is executed, and if not so, an operation of step g is executed.

In step b, based on the detection signal from the connection detection means 90, whether the corresponding terminal device is electrically connected or not is reconfirmed. If no electrical connection is made, an operation of step f is executed to maintain the incoming call setting condition by vibrator function.

On the other hand, if the electrical connection is made, an operation of step c is executed, and the alarm sound to inform the user of the fact that the vibrator function is being set is informed by controlling the acoustic source 51.

Whether the setting of the incoming call information has been changed to the information by audible sound or not is monitored (Step d). If the change is made, an operation of step g is executed to assume the condition of waiting the information by the incoming call sound to continue charging. On the other hand, if not so, an operation of step e is executed.

In the step e, whether a predetermined time is elapsed from the time of the shift to the step d or not is monitored. If the predetermined time is not elapsed, then the operation of step d is executed again to assume the condition of waiting for the setting of the incoming call information. On the other hand, if the predetermined time is elapsed in step e, an operation of step f is executed to assume the condition of waiting for the incoming call information by vibrator function to continue charging.

As described above, in the PHS terminal unit of the above constitution, when charging is commenced under the condition of the incoming call information by vibrator being set, the set condition is detected and an alarm sound is generated. This makes it possible to invite the user's attention about the charging under the set condition of the incoming call information by vibrator function.

In the above embodiment the setting of the incoming call information method is made by operating the key input section 72, but the method is not limited thereto but the incoming call informing method may be changed by an independent selection switch such as a slide switch. Alternatively, the connection with the charger is limited to the contact type but the non-contact type, which is combined in electromagnetic system by magnet or the like, may be employed.

One of the conventional terminal devices automatically changes to the incoming call information by audible sound when charging with the charger is started during the setting of incoming call by the vibrator function. Such a system has a problem of automatically changing to the incoming call information by audible sound without regard to the user's intention even in case of the user not desiring to have call sound because of going to bed. However, according to the terminal device of the present invention, it does not occur for the system to change over automatically to the incoming call information by audible sound while the user is not aware of the change.

The present invention is not limited to the above embodiment. In the above embodiment, explanation has been made taking an example of the case of electrical connection with the charger. However, the invention is also applicable to other electrical connections. For instance, in case of connecting a cable for data communication, prevention can be made from damaging the cable connector terminal.

In the above embodiment, it is designed to detect whether the charger 91 is being charged from the battery 80 or not, but the charge detection method may not be such one. For example, the constitution may be that a switch is provided on the site at which the connection with the charger of the terminal device can be detected or that the power supply from the charging terminal to the battery is detected.

Moreover, in the above embodiment, there is an arrangement to issue an alarm sound to call the user's attention, but the system is not limited thereto. Attention may be called by displaying a message on the display section 71 or by alternately turning on and off the light source 52.

In the above embodiment, the user's attention is called by an alarm or the like at the point of detecting the electrical connection with the external device. However, in case that no communication can be made while the unit is connected with the external device, for example, in case the external device is a PC card 92, it is apparent that the unit is connected with a personal computer as an external device, so that the control means 100 may be set to automatically inhibit the incoming call at the time of the detection of the electric connection. The operation in such a case is shown in FIG. 3.

Figure 3:
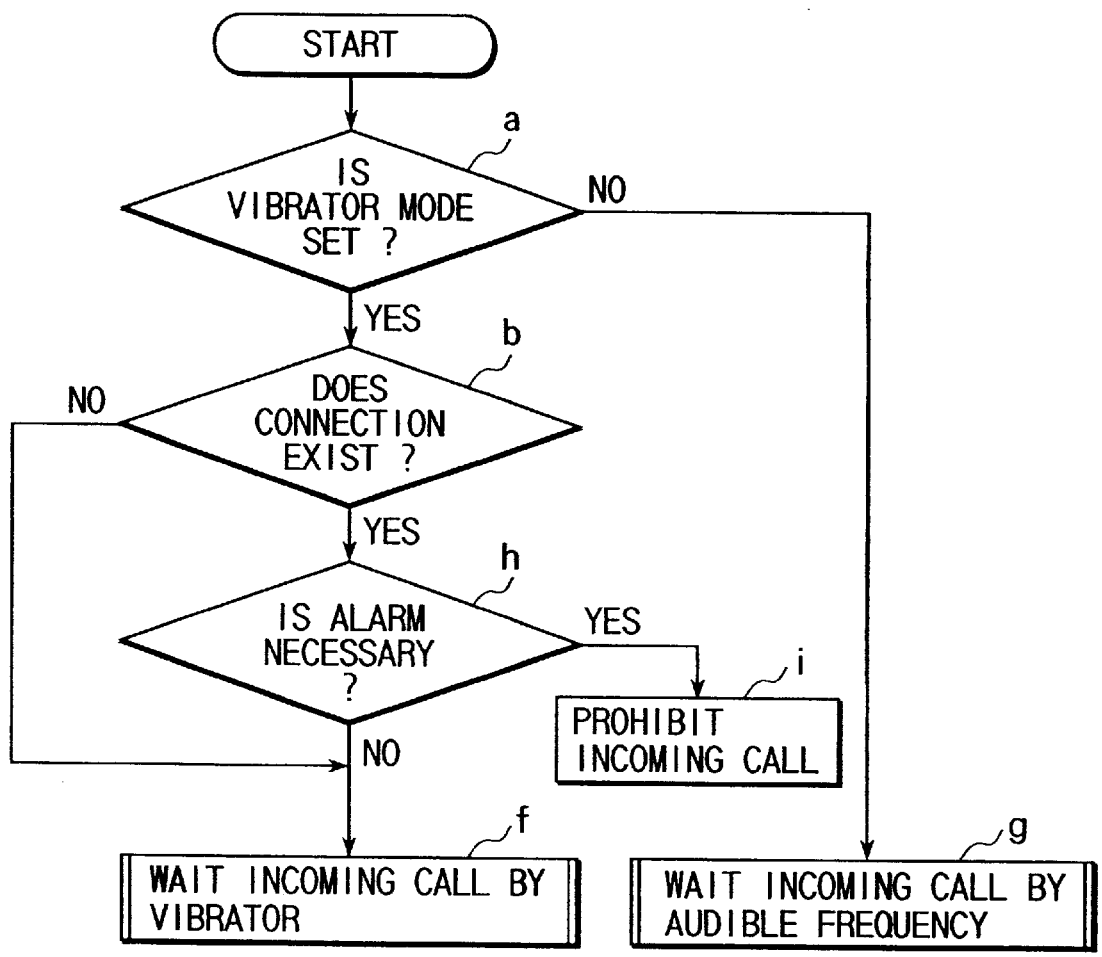
FIG. 3 is a flow chart showing other motion of the terminal unit shown in FIG. 1.

In FIG. 3, the same operations as those of FIG. 2 are indicated in the same codes and detailed explanations of them are omitted.

In Step b, in case of no electrical connection, the operation of step f is executed as in the case of FIG. 2 and the incoming call set condition by the vibrator function is maintained. If an electrical connection exists, whether it is an apparatus on which warning is necessary or not (Step h) is determined. If the device of which warning is not necessary, the incoming call mode is set to the incoming call inhibition mode (Step i).

By setting as above, the incoming call condition automatically becomes the incoming call inhibition mode, so that the problem attributed to the incoming call excitation is eliminated. Further, in this case when no electrical connection exists (in case the terminal device has been removed from the apparatus), the incoming call condition may be returned again to the vibrator incoming call mode or another desired incoming call mode may be selected.

In the above modification example, the system has been designed to inhibit the incoming call only in the case of the vibrator incoming call. However, the incoming call can be inhibited if no communication can be made in any mode.

The external device includes, for example, a car kit and the like.

With respect to the vibration pattern of the vibrator incoming call mode, there is an intermittent or a continuous vibration pattern. As to the vibrator incoming call mode, all the incoming call modes are included such as for example the case of changing from "vibrator incoming call mode→silent (luminescence) incoming call mode" or "vibrator incoming call mode→acoustic incoming call mode" to other mode, or vice versa.

In the above embodiment explanation is given by taking an example of the terminal device of PHS. Needless to say, however, the invention may be applied to other communication terminal devices such as a portable telephone to give the similar effects.

It goes without saying that the invention can be similarly workable with various modifications within the scope of and not deviating from the purport of the present invention.

What is claimed is:

1. A radio communication apparatus adapted to be connected to a battery charger, said radio communication apparatus comprising:
    a controller for setting an alert for indicating reception of an incoming call;
    a first detector for detecting whether a vibrating alert is set;
    a second detector for detecting whether said radio communication apparatus is connected to a battery charger; and
    an alerting source for generating an alert indicating a condition other than reception of an incoming call responsive to said second detector detecting that said radio communication apparatus is connected to the battery charger and said first detector detecting that the vibrating alerting is set.

2. The radio communication apparatus according to claim 1, wherein said alerting source is configured to generate a sound.

3. The radio communication apparatus according to claim 1, wherein said alerting source is configured to generate a visual alert.

4. A radio communication apparatus adapted to be connected to a data communication interface, said radio communication apparatus comprising:
    a controller for setting an alert for indicating reception of an incoming call;
    a first detector for detecting whether a vibrating alert is set;
    a second detector for detecting whether said radio communication apparatus is connected to a data communication interface; and
    an alerting source for generating an alert indicating a condition other than reception of an incoming call responsive to said second detector detecting that said radio communication apparatus is connected to the data communication interface and said first detector detecting that the vibrating alerting is set.

5. The radio communication apparatus according to claim 4, wherein said alerting source is configured to generate a sound.

6. The radio communication apparatus according to claim 4, wherein said alerting source is configured to generate a visual alert.

7. A radio communication apparatus adapted to be connected to a data communication interface, said radio communication apparatus comprising:
    a controller for setting an alert for indicating reception of an incoming call and for inhibiting generation of an alert indicating reception of an incoming call;
    a first detector for detecting whether a vibrating alert is set; and
    a second detector for detecting whether said radio communication apparatus is connected to a data communication interface,
    wherein said controller inhibits generation of an alert indicating reception of an incoming call responsive to said second detector detecting that said radio communication apparatus is connected to the data communication interface and said first detector detecting that the vibrating alerting is set.

8. In a radio communication apparatus adapted to be connected to a battery charger, a method comprising the steps of:
    detecting whether a vibrating alert is set;
    detecting whether said radio communication apparatus is connected to a battery charger; and
    generating an alert indicating a condition other than reception of an incoming call responsive to the steps of detecting that said radio communication apparatus is connected to the battery charger and detecting that the vibrating alerting is set.

9. In a radio communication apparatus adapted to be connected to a data communication interface, a method comprising the steps of:
    detecting whether a vibrating alert is set;
    detecting whether said radio communication apparatus is connected to a data communication interface; and
    generating an alert indicating a condition other than reception of an incoming call responsive to the steps of detecting that said radio communication apparatus is connected to the data communication interface and detecting that the vibrating alerting is set.

10. In a radio communication apparatus adapted to be connected to a data communication interface, a method comprising the steps of:
    detecting whether a vibrating alert is set;
    detecting whether said radio communication apparatus is connected to a data communication interface; and
    inhibiting generation of an alert indicating reception of an incoming call responsive to the steps of detecting that said radio communication apparatus is connected to the data communication interface and detecting that the vibrating alerting is set.

* * * * *